(12) United States Patent
Hanser et al.

(10) Patent No.: US 6,665,597 B1
(45) Date of Patent: Dec. 16, 2003

(54) AUTOMATIC SUSPENSION CONTROL SYSTEM FOR MOTOR VEHICLES

(75) Inventors: Paul Edmund Hanser, Tipton, IA (US); John Friede, Walcott, IA (US); Mitchell P. Schmalz, Iowa City, IA (US)

(73) Assignee: HWH Corporation, Moscow, IA (US)

( * ) Notice: Subject to any disclaimer, the term of this patent is extended or adjusted under 35 U.S.C. 154(b) by 0 days.

(21) Appl. No.: 10/248,887

(22) Filed: Feb. 27, 2003

(51) Int. Cl.[7] .......................... B60G 17/01; G06F 7/00; G06F 19/00
(52) U.S. Cl. .................... 701/37; 280/5.514; 280/6.157
(58) Field of Search .................. 701/37, 36; 280/5.514, 280/433, 6.159, 6.153, 6.157, 124.11, 5.507; 180/170, 41, 24, 197, 282

(56) References Cited

U.S. PATENT DOCUMENTS

| | | | | |
|---|---|---|---|---|
| 4,386,791 A | * | 6/1983 | Watanabe ................ | 280/6.157 |
| 4,923,210 A | * | 5/1990 | Heider et al. ............ | 280/6.153 |
| 5,215,328 A | * | 6/1993 | Bono et al. .............. | 280/6.157 |
| 2002/0096841 A1 | * | 7/2002 | Hedenberg ............... | 280/6.159 |
| 2003/0047906 A1 | * | 3/2003 | Hicks et al. | |
| 2003/0051933 A1 | * | 3/2003 | Bell .......................... | 180/170 |
| 2003/0057663 A1 | * | 3/2003 | Trescott ................... | 280/5.514 |

* cited by examiner

*Primary Examiner*—Thomas G. Black
*Assistant Examiner*—Ronnie Mancho
(74) *Attorney, Agent, or Firm*—James C. Nemmers

(57) ABSTRACT

A vehicle ride-height and automatic suspension control system for a vehicle having an air suspension system. The automatic suspension control system provides the vehicle operator with selectable ride-heights and controls vehicle level as it rounds curves or corners. The system utilizes a series of photoelectric sensors that are linked between the vehicle chassis and axles and are combined with the vehicle steering system. Continuously sampling of the photoelectric sensors by a controller increments or decrements a digital register. When the counter reaches either the upper or lower selected threshold values the appropriate air bag is inflated or deflated for a duration of time. System sensitivity is adjustable by selecting different counter thresholds and by selecting the duration of air bag inflation or deflation.

13 Claims, 8 Drawing Sheets

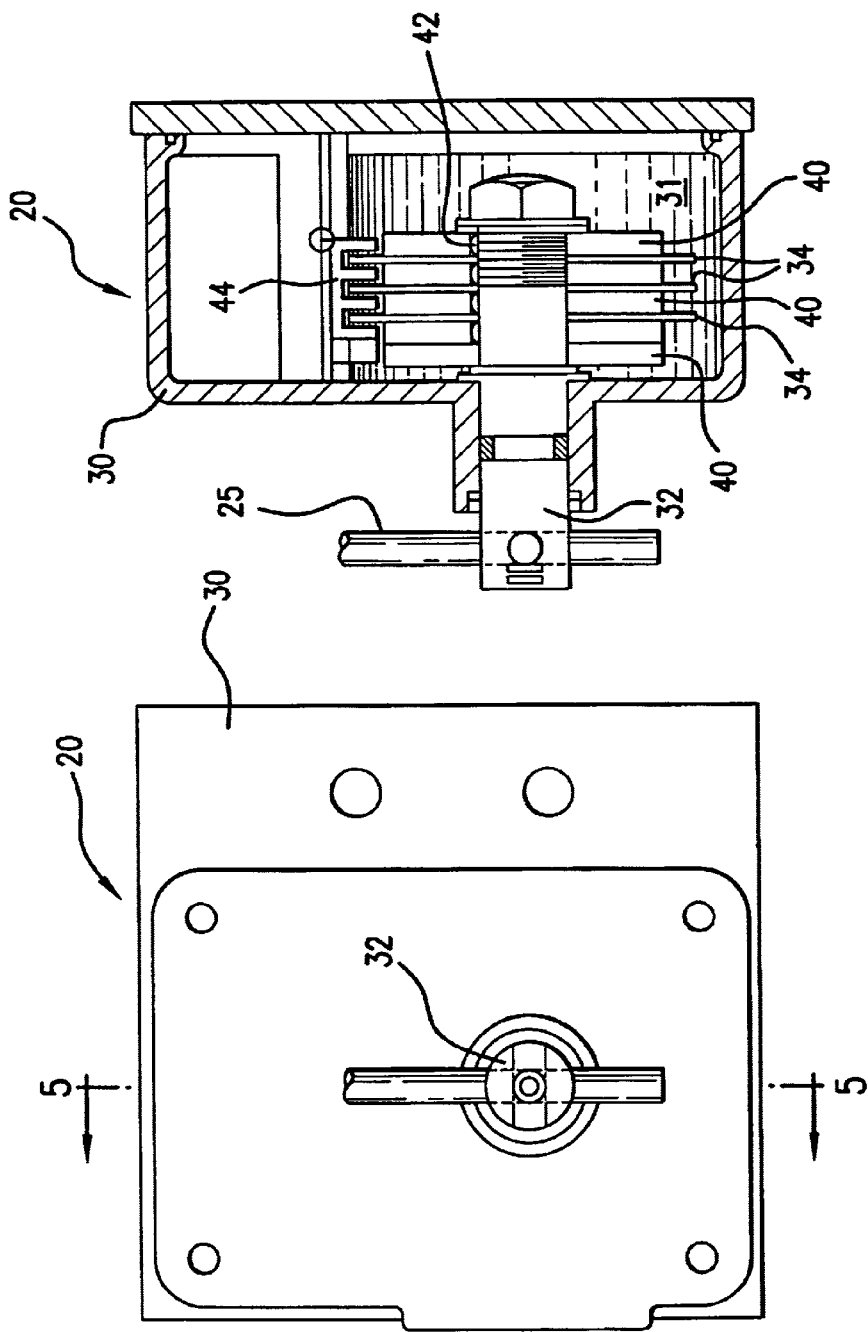

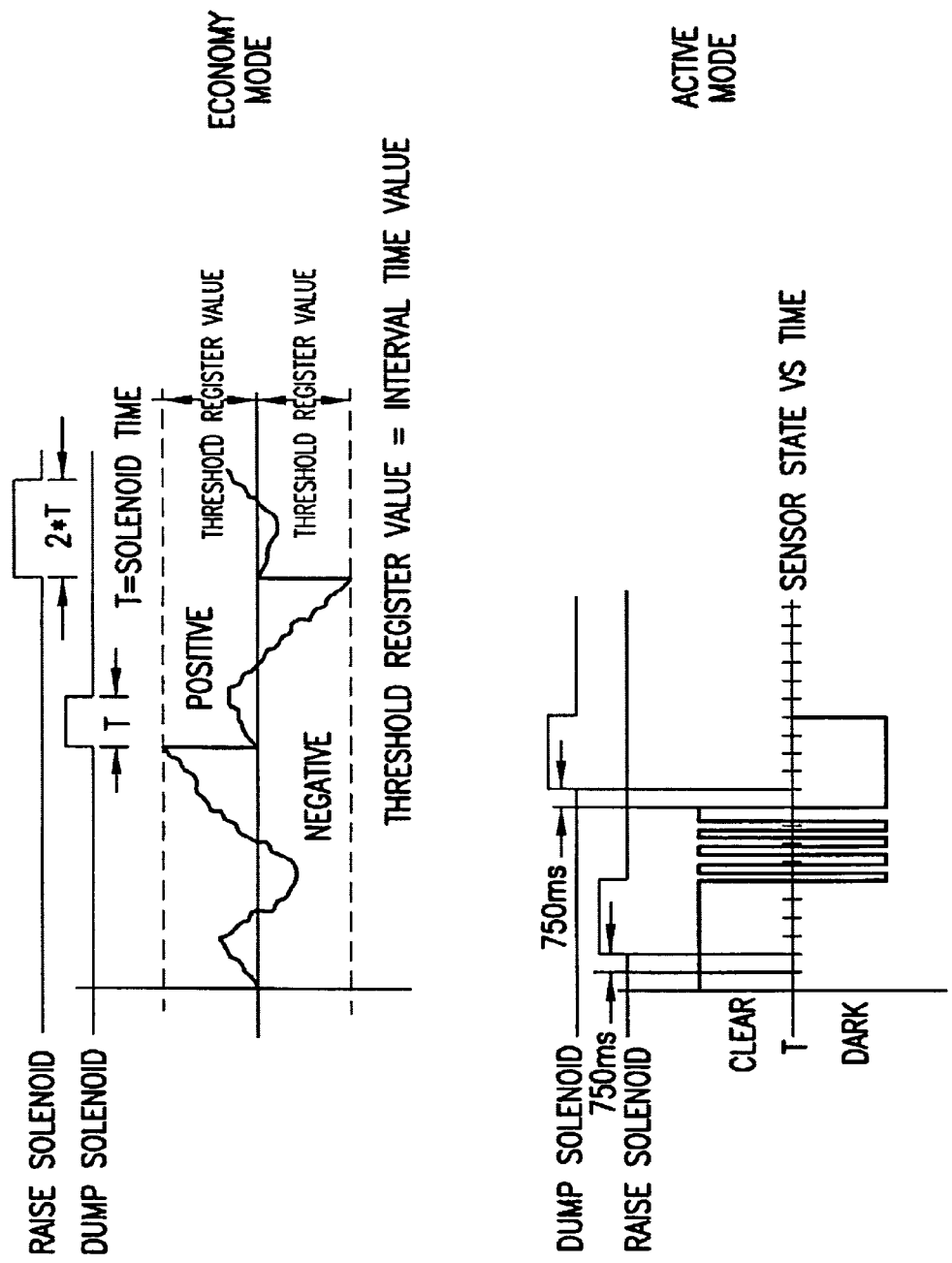

US 6,665,597 B1

AUTOMATIC SUSPENSION CONTROL SYSTEM FOR MOTOR VEHICLES

BACKGROUND OF INVENTION

This invention relates to automatic suspension control systems for motor vehicles, and more particularly to a computer controlled air suspension system for motor homes and recreational vehicles.

Ride-height control systems for motor homes and recreational vehicles are well known in the art. These systems typically utilize air suspension systems which permit the distance between the axles and chassis to be adjusted according to the amount of pressure within the air bags. The ride-height of the vehicle may therefore be adjusted for varying loading conditions, road conditions, wind, and rough terrain. Systems for maintaining a particular ride-height for varying conditions generally utilize a vehicle pneumatic system, comprised of an air compressor and air tank, and a pneumatic valve connected to each of the vehicle air bags. Each of the valves is secured to the vehicle chassis and connected to the vehicle axle by means of a mechanical linkage. As the distance between the chassis and axle fluctuates, air is supplied to, or vented from, each air bag through its respective valve. These systems are unsatisfactory for a number of reasons. First is the requirement for manually adjusting each valve linkage to select a new ride height as environmental conditions change. Second, these systems utilize a great deal of air, and therefore put a constant drain on the vehicle pneumatic system, due to the constant transfer of air into and out of the bags as the chassis and axle oscillate and the system "hunts" for the proper setting. Further, with known systems, adjusting the sensitivity of the system for different quality of ride requires changing the pneumatic valves.

SUMMARY OF INVENTION

The present invention discloses a vehicle ride-height and automatic suspension control system with selectable ride-heights and sensitivity. The invention also provides for automatic control of the suspension system as the vehicle rounds curves or corners by means of a gear tooth counter and direction sensor that is combined with the vehicle steering system.

The system of the invention utilizes a series of photo-electric cells activated by shutters on a shaft that are placed offset to each other and are mechanically linked between the vehicle chassis and axle. The offset provides for more than one ride-height setting.

Sampling a photoelectric cell by a controller every millisecond increments or decrements a counter or register. When the counter reaches either the upper or lower threshold value the appropriate solenoid valve is energized to inflate or deflate a particular air bag for a duration of time that is selected by the user.

System sensitivity is adjustable by selecting different counter thresholds and by selecting the duration of solenoid actuation.

In addition, a gear tooth counter and direction sensor are utilized to detect direction and degrees of rotation of the steering wheel. This allows the controller to select one of two modes (economy or active) of suspension control. Surpassing set limits of movement of the steering system determines the appropriate selection of modes to minimize roll of the vehicle when rounding curves or corners or when abrupt turns are made.

BRIEF DESCRIPTION OF DRAWINGS

These and other advantages and features of the invention will become apparent upon an understanding of the best mode for carrying out the invention as described hereinafter in conjunction with the following drawings:

FIG. 4 is an end view of the sensing unit of FIG. 3;

FIG. 5 is a cross-sectional view of the sensing unit taken along line 5—5 in FIG. 4;

FIG. 8 is diagram illustrating the threshold register values and interval time values for actuating the solenoids that control the air to the suspension air bags;

DETAILED DESCRIPTION

Figure 1:
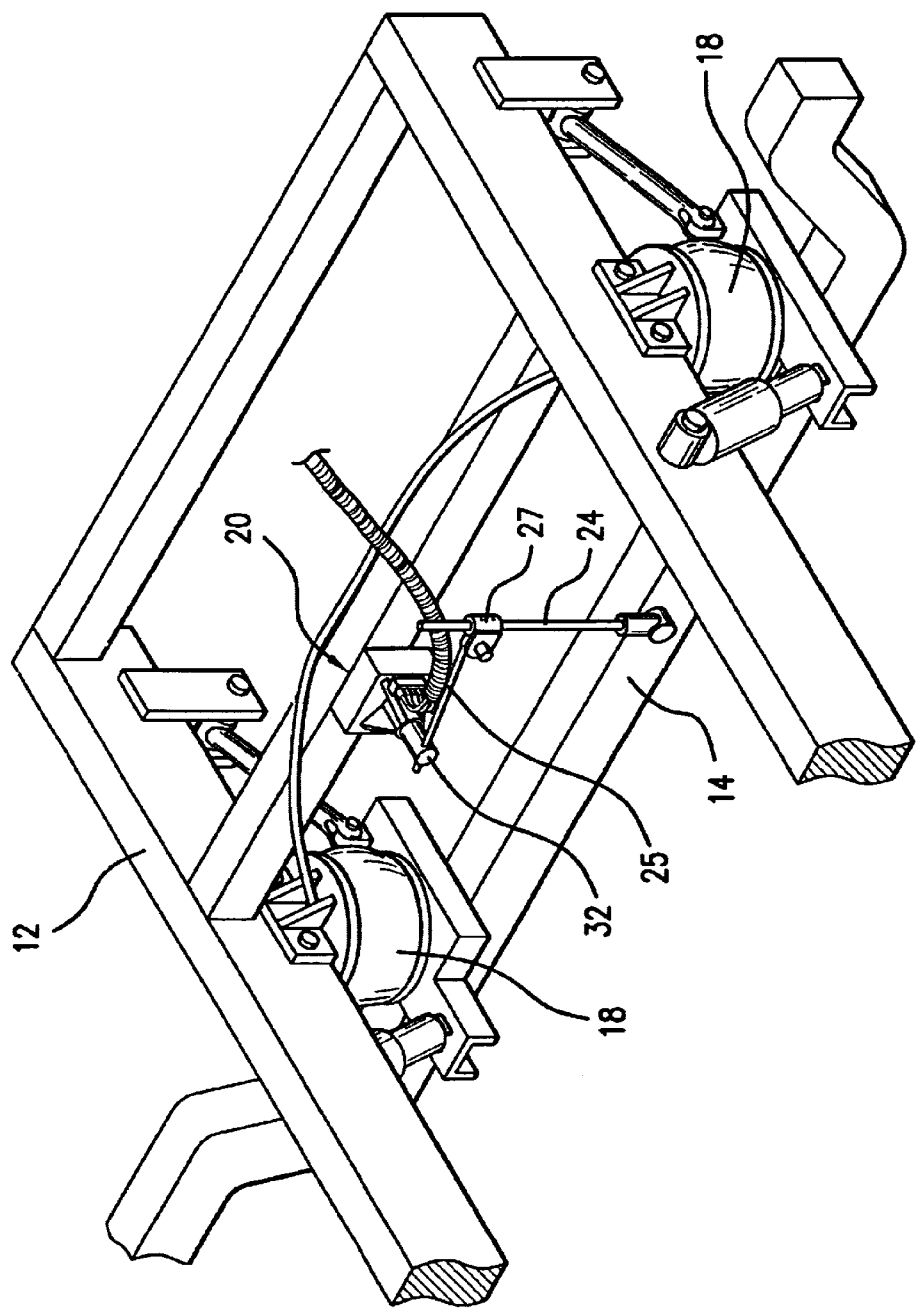
FIG. 1 is a perspective view of the forward end of a typical vehicle suspension system utilizing the present invention.
Figure 2:
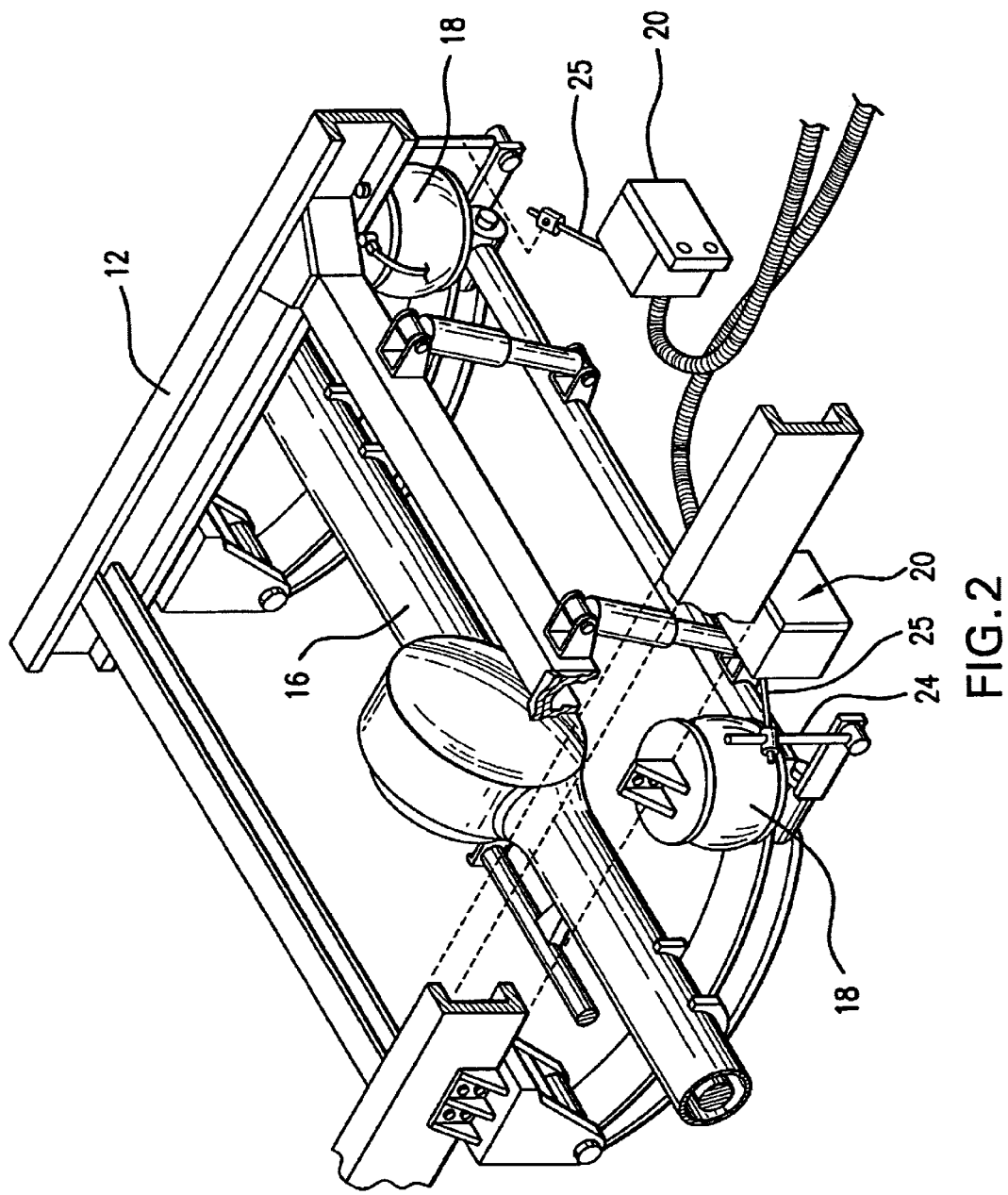
FIG. 2 is a perspective view of the rear end of a typical vehicle suspension system utilizing the present invention.

Referring now to the drawings, wherein like reference numerals designate identical or corresponding parts throughout the several views, FIGS. 1 and 2 show the forward and rear ends of a typical vehicle air suspension system that utilizes air bags mounted adjacent each wheel of the vehicle. The air suspension system typically comprises a vehicle chassis 12, forward axle 14, rear axle 16, and air bags 18, supporting the axles 14 and 16 from the chassis 12. The depicted system utilizes a single sensing unit, indicated generally by the reference numeral 20, in the forward end which unit 20 controls both forward air bags 18, and two sensing units 20 in the rear end each controlling a single air bag 18. All the sensing units 20 are substantially identical in construction and operation and therefore only one such unit will be described in detail.

The sensing units 20 are secured to the vehicle chassis 12 and are mechanically linked to the vehicle axles 14 and 16 of air suspension system 22 by means of a pair of connecting arms 24 and 25. Arm 24 is pivotally connected to the respective one of the axles 14 or 16 and is adjustably and pivotally connected to the other connecting arm 25 by connector 27 that adjustably receives the arm 24. Connecting arm 25 has its other end connected to the shaft 32 of sensing unit 20. As best seen in FIG. 5, shaft 32 is rotated by means of the connecting arm 25. This arrangement allows the sensing units 20 to continuously monitor the distance between the chassis 12 and the axles 14 and 16 through action of the arms 24 and 25 as more fully described hereinafter.

Figure 3:
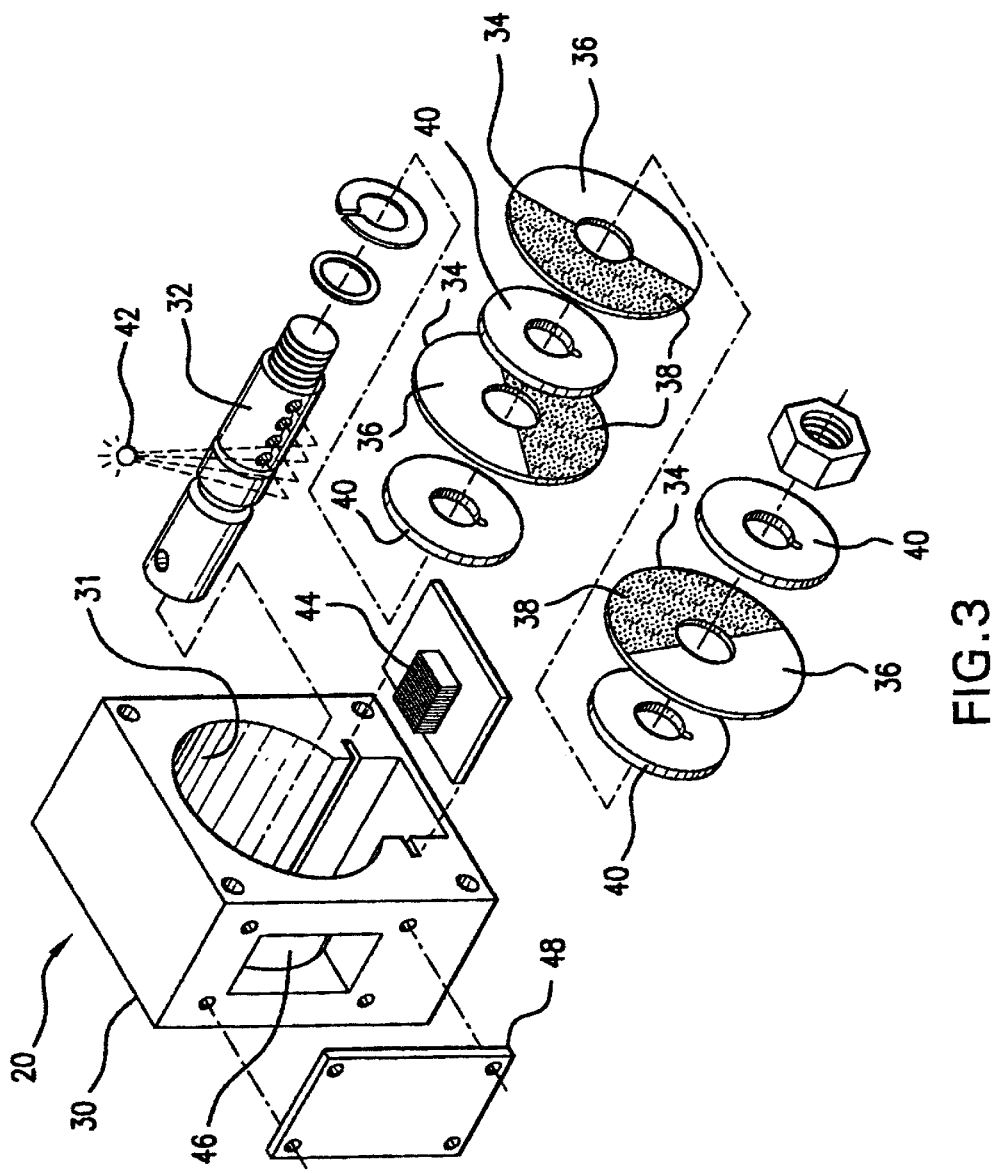
FIG. 3 is an exploded view of a sensing unit utilizing photocells and shutter.

A sensing unit 20 is shown in detail in FIGS. 3, 4 and 5 and is comprised of a housing 30 having a key-shaped hollow interior 31 that receives an elongated shaft 32 which carries a plurality of shutter disks 34. The shutter disks 34 each have a clear section 36 and an opaque section 38 and are mounted on the shaft 32 in a spaced-apart relationship sandwiched between a plurality of spacer disks 40, as best seen in FIG. 3. The spacer disks 40 are keyed to the shaft 32 by key balls 42 and are thereby prevented from rotating relative to the shaft 32. However, the shutter disks 34 are mounted on the shaft 32 between the spacer disks 40 in a manner to provide for manual rotation and thus adjustment of the shutter disks 34 relative to the shaft 32, albeit with considerable force. This allows the shutter disks 34 to be positioned with the clear/opaque interfaces in the desired position relative to the shutter's respective photoelectric cells 44. Manual repositioning of the shutter disks 34 may be accomplished, for example, via access opening 46, which is normally sealed by means of cover 48. This repositioning has the effect of selecting a new ride-height to be maintained by that particular shutter disk 34 since the clear/opaque interface line has been moved with respect to its respective photocell 44. Preferably, the air bags 18 use tapered pistons providing for varying the vehicle ride from soft to stiff.

Figure 6:
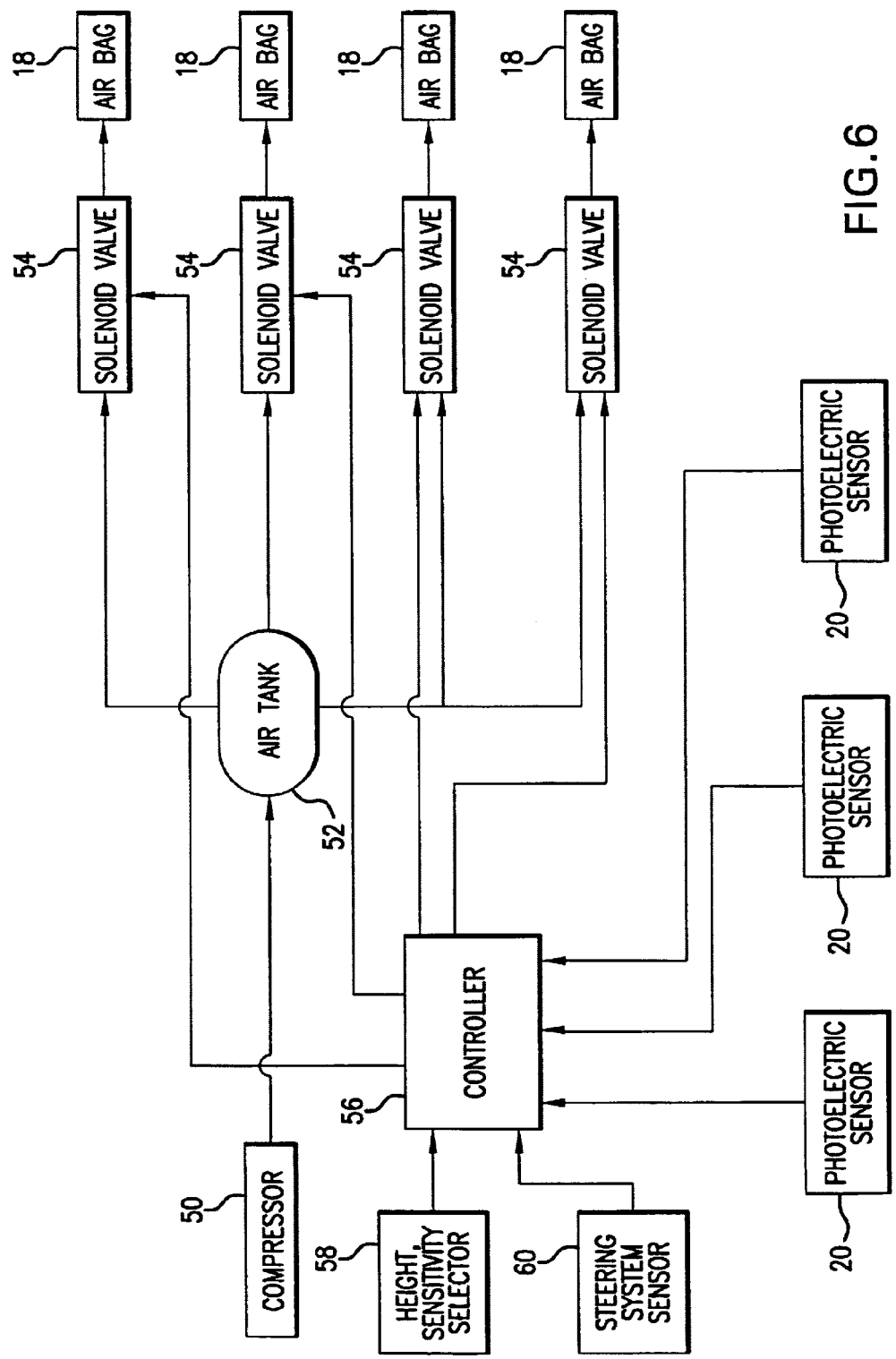
FIG. 6 is a block diagram of a the pneumatic and control system by which the invention is accomplished.
Figure 7:
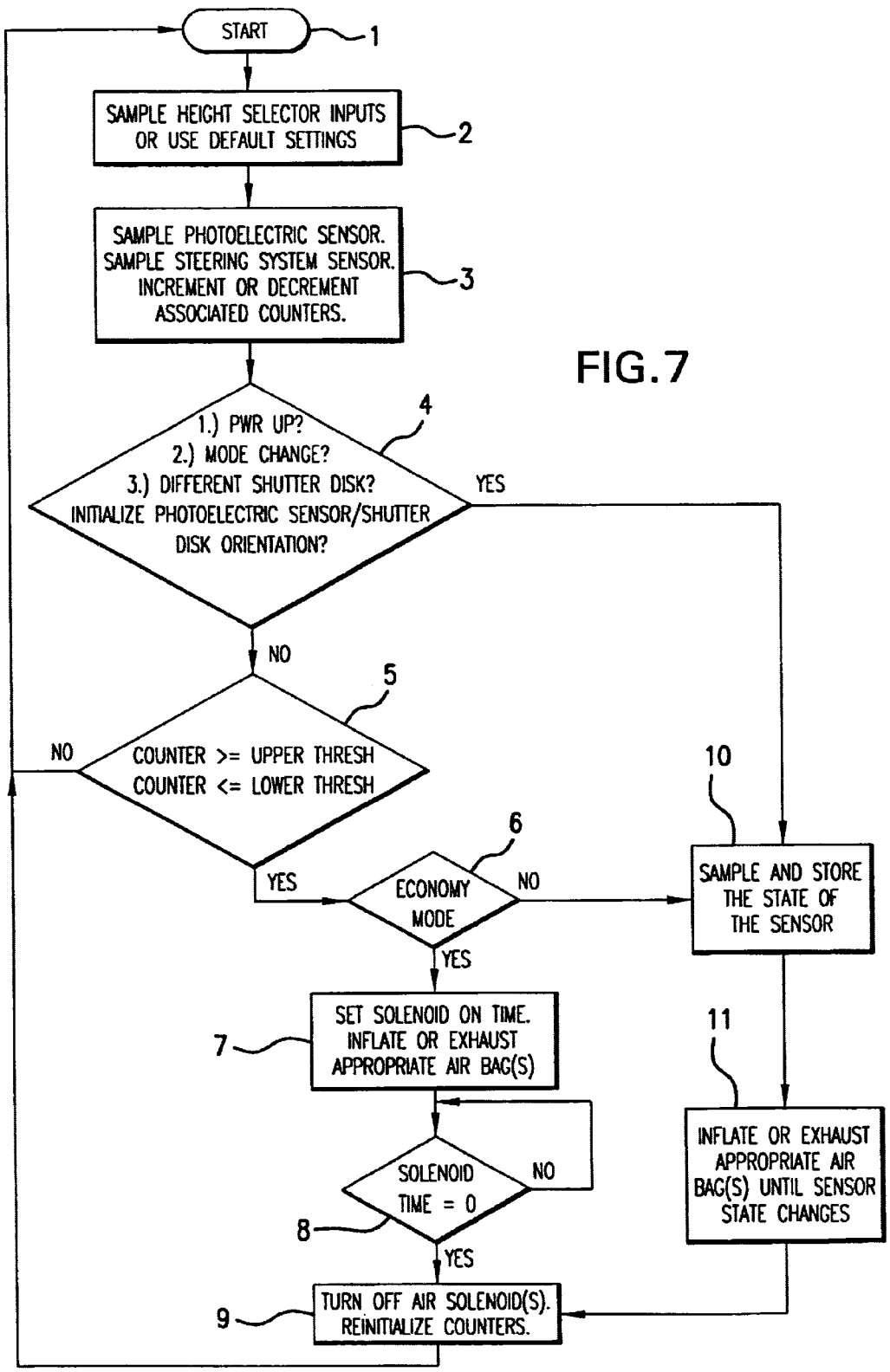
FIG. 7 is a schematic block diagram illustrating the steps of the controller that is a part of the system and method.

With the sensing units 20 in place, as the distance between the vehicle axle 14 or 16 and the vehicle chassis 12 varies, connecting arms 24 and 25 will cause the shaft 32 of a sensing unit 20 to rotate. This in turn causes the shutter disks 34 to rotate. In a preferred embodiment, each sensing unit 20 contains three shutter disks 34, each which determines a different vehicle ride-height (distance between the chassis and axle), as for example high, medium, and low. The interface line between the clear section 36 and opaque section 38 on each of the disks 34 is rotationally offset from the interface line of the other disks to provide for these different ride heights. A block diagram of the basic pneumatic control system is shown in FIG. 6. A standard vehicle pneumatic system typically includes an air compressor 50 and an air tank 52 connected to four solenoid valves 54, two of which valves 54 control the air bags 18 the rear of the vehicle, and two of which valves 54 control the bags 18 in the front of the vehicle. Each of the four solenoid valves 54 may add air to, or vent air from, its respective air bag(s) 18 under the direction of a controller 56. The function of the controller 56 is schematically shown in FIG. 7, with each functional block being designated by a "step" number. FIG. 7 and the appropriate step will be referred to in the description hereinafter.

Selection of one of the three ride-heights (low, medium, high) is typically made by the vehicle operator by operating the appropriate height select switch 58 on the vehicle control panel. Actuation of the ride height switch 58 by the operator (FIG. 7, step 2) to select the desired ride height instructs the controller 56 to monitor a particular shutter disk 34 and photoelectric cell 44 in each sensing unit 20 (FIG. 7, step 3). The selected photoelectric cell 44 is sampled every millisecond to determine the position of the clear/opaque interface line on its respective shutter disk 34, which is continually being rotated due to vehicle oscillations. If the clear portion 36 of the shutter disk 34 is positioned within the photoelectric cell 44, indicating that the selected ride height is too low, the photoelectric cell 44 will conduct and a "low" signal will be sent to the controller 56. Similarly, if the opaque portion 38 of the shutter disk 34 is positioned within the photoelectric cell 44, indicating that the selected ride-height is too high, the photoelectric cell 44 will not conduct and a "high" signal will be sent to the controller 56.

The ride height selector 58 allows the user to select sensitivity of three different variables. First, the counter threshold value at which a command is sent by the controller 56 to a solenoid valve 54 may be increased or decreased. Secondly, the duration of the solenoid valve 54 operation may be increased or decreased, thereby increasing or decreasing the amount of air in the air bags 18 during a particular command. The height selector 58 also allows the user to select one of three shutter disks 34 to vary the distance between the frame and the axle. For example, this selection allows the vehicle operator to make corrections to compensate the vehicle level while driving along a crowned road.

A signal is sent by the controller 56 to all solenoid valves 54 appropriately inflating or deflating the air bag(s) 18 until a state change of the photoelectric cell 20 has been detected, i.e., if power is initially applied to the controller 56, or a different shutter disk 34 is selected, or the steering mode has changed, as described hereinafter.

Figure 10:
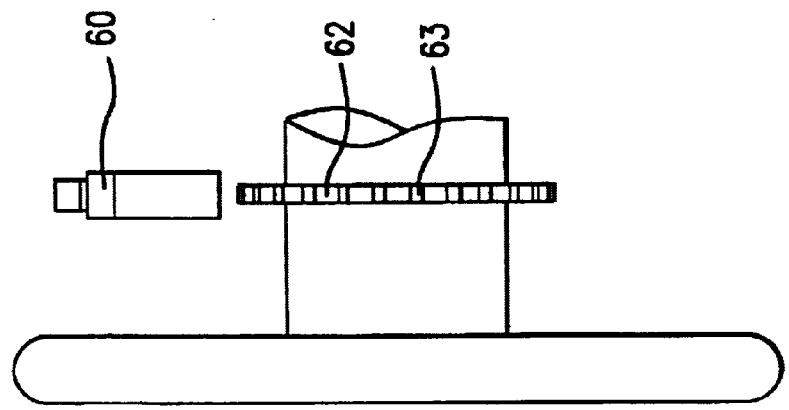
FIG. 10 is a schematic side view of the steering system and counter-sensor of FIG. 9.
Figure 9:
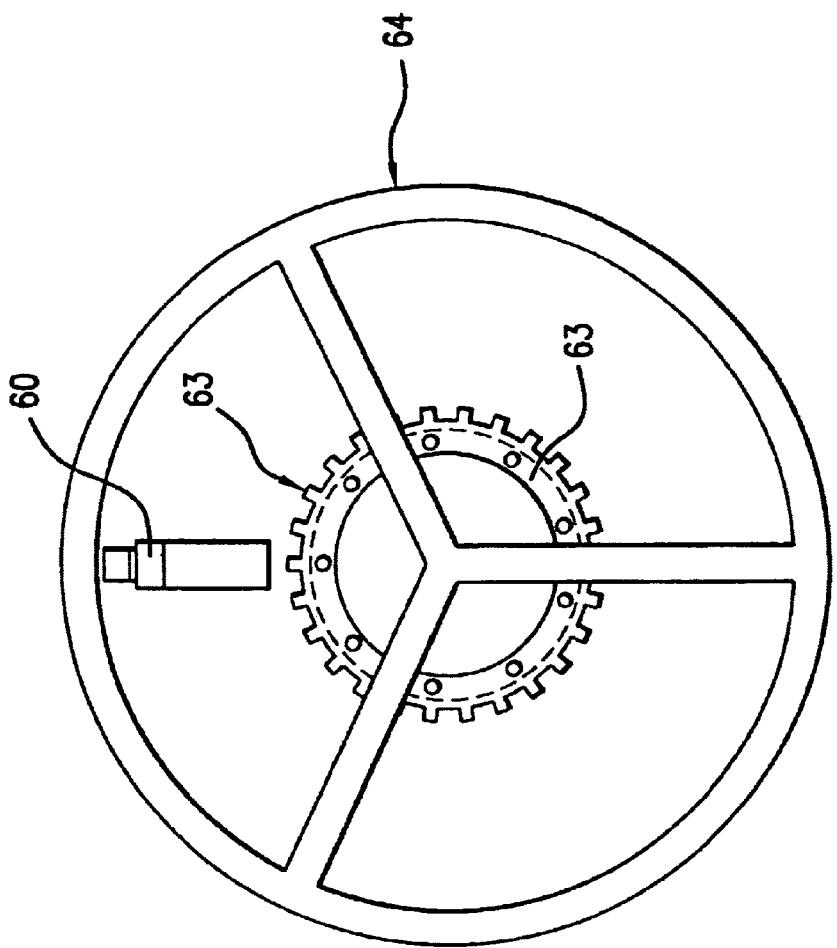
FIG. 9 is a schematic view of a vehicle steering wheel and gear to illustrate the gear tooth counter and direction sensor.

The basic system of the invention is also useful for stabilizing vehicle roll when cornering or rounding curves. When the vehicle is traveling at or below a predetermined speed, approximately 15 mph or less, the controller 56 maintains an "economy" mode regardless of the amount of rotation of the steering system. As illustrated in FIGS. 9 and 10, a fixed gear tooth counter and direction sensor 60 along with a gear 62 having teeth 63 are combined with the steering wheel 64 of the vehicle and used to detect direction and degrees of rotation of the steering system to determine which mode, the economy mode or the "active" mode, will be selected by the controller 56. A steering system counter in controller 56 (FIG. 7, step 3) is decremented each time the sensor 60 detects a gear tooth 63 passing the face of sensor 60 moving counter clockwise, which indicates the vehicle is turning left. Similarly, the steering system counter in controller 56 is incremented each time the sensor 60 detects a gear tooth 63 passing the face of sensor 60 moving clockwise, thus indicating the vehicle is turning right.

The controller 56 will maintain the active mode until such time that the steering system counter returns to a value within the selected threshold values (see FIG. 8). An additional 6 seconds of active mode is performed to assist the air bags 18 to return to a balanced pressure relative to each other. The steering system counter is then reinitialized to zero in relationship with a gear tooth 63, or absence of a gear tooth, present to the sensor 60 at that instant. The reinitializing method used allows the system to adjust to the physical relation of the steering wheel 64 to the path the vehicle is on. This permits the system to remain in economy mode even if driving in a strong side wind.

The system also provides the user the ability to completely deflate all air bags 18 or inflate all air bags 18 to system pressure to enhance low speed maneuvering, e.g., passing under a structure or driving over a street curb. However, when the vehicle is traveling at a speed above the predetermined speed, the system is able to select the modes automatically (see FIG. 7).

As previously indicated, the ride-height counter in controller 56 (FIG. 7, step 3) is decremented each time the sensor 20 is sampled and light passes through the shutter 34 indicating the vehicle ride height is low. The ride-height counter is incremented each time the sensor 20 is sampled and light is blocked by the shutter 34 indicating the vehicle ride-height is high. When the steering system (FIG. 9) prompts the controller 56 to operate in economy mode, the upper or lower threshold counter values are determined by the height selector inputs (FIG. 7, step 2). When the ride height counter reaches either the upper or lower threshold, the appropriate solenoid valve 54 for that sensing unit 20 is energized to inflate or deflate the corresponding air bag 18 for the selected duration of time (FIG. 7, step 7). After the selected duration of time has elapsed (FIG. 7, step 8), the counter is reinitialized to the reference level that counting can be reinitiated (FIG. 7, step 9).

When the steering system (FIGS. 9 and 10) prompts the controller 56 to operate in active mode, the upper or lower threshold counter values are set at 0.75 seconds. When the counter reaches either the upper or lower threshold (FIG. 7, step 5), the appropriate solenoid valve 54 for that sensing unit 20 is energized to inflate or deflate the corresponding air bag 18 until a state change of the sensing unit 20 has been detected (FIG. 7, step 11). After a state change has been detected, the corresponding solenoids 54 are turned off and the counter is reinitialized to the reference level so that counting can be reinitiated (FIG. 7, step 9). While in active mode and a rear air bag 18 is being inflated, the corresponding front air bag 18 is also inflated to assist in maintaining the proper distance between the chassis 12 and axle 14 of the vehicle.

While this specification has described preferred embodiments of the invention utilizing a photoelectric cell and shutter arrangement to pass discreet high/low signals to a digital counter, it is clear that other switching and indicating devices may also be utilized. For instance, a simple mechanical switch, if sufficiently durable, could be used to pass the high/low signals. It is therefore to be understood that the invention is not limited to the specific components set forth herein for purposes of exemplification, but is to be limited only by the scope of the appended claims including the full range of equivalency to which each element thereof is entitled.

What is claimed is:

1. An automatic suspension control system for controlling the suspension system of a motor vehicle moving at variable speeds and having a steering system including a steering wheel, and having a chassis, an axle, and an air bag suspension system that includes inflatable air bags supporting the chassis on the axle, the control system comprising:

an operator controlled selector for selecting desired ride-height values for the vehicle chassis with respect to the vehicle axle;

a sensor for monitoring the actual ride-height of the vehicle chassis with respect to the vehicle axle and producing a high or low signal when the vehicle chassis is above or below the selected ride height value;

a digital register for receiving and counting the signals and producing a net positive or negative register value during a selected time period;

a controller for creating desired threshold positive and negative register values and monitoring the time duration during which a register value was above or below a desired threshold value; and a pneumatic system for inflating or deflating selected air bags to adjust he actual ride-height in response to the controller.

2. The automatic suspension control system of claim 1 in which the controller monitors the speed of the vehicle, and the controller maintains the control system always in an economy mode when the vehicle speed is less than a predetermined speed.

3. The automatic suspension control system of claim 2 in which a steering system sensor is combined with the steering system to monitor the direction and amount of rotation of the steering wheel, and the controller includes a steering system counter with predetermined threshold values, the counter being incremented and decremented by the steering wheel sensor each time the steering wheel is turned right or left a predetermined amount, the controller producing inflation or deflation of selected air bags in response to the threshold values being exceeded if the vehicle speed is at or above the predetermined speed and thereby the control system is in an active mode, thereby minimizing the roll of the vehicle chassis.

4. The automatic suspension control system of claim 3 in which the predetermined vehicle speed between the economy mode and active mode is about 15 miles per hour.

5. The automatic suspension control system of claim 3 in which the vehicle has a front and a rear axle and a left and a right wheel on each axle with an air bag combined with each wheel, and the operator controlled selector provides of individual air bags to adjust the vehicle level when the vehicle is traveling over crowned roads.

6. The automatic suspension control system of claim 3 in which the steering system sensor includes a gear having teeth, the gear being combined with the steering wheel of the vehicle and rotatable in direct response to the turning of the steering wheel, and the sensor counts the number of teeth and the direction of rotation of the gear when the steering wheel is turned.

7. The automatic suspension control system of claim 3 in which the controller continues to maintain the control system in the economy mode when the vehicle speed is at or above the predetermined speed unless the threhold values of the steering system counter are exceeded.

8. A method for controlling the suspension system of a motor vehicle while moving at variable speeds, the vehicle having a steering system including a steering wheel, and having a chassis, an axle, and an air bag suspension system that includes inflatable air bags supporting the chassis on the axle, the method comprising the steps of:

selecting desired ride-height values for the vehicle chassis with respect to the vehicle axle;

monitoring the actual ride-height of the vehicle chassis with respect to the vehicle axle;

producing a high or low signal when the vehicle chassis is above or below the selected ride height value;

counting the signals and producing a net positive or negative register value during a selected time period;

creating desired threshold positive and negative register values; monitoring the time duration during which a register value was above or below the desired threshold value; and inflating or deflating selected air bags to adjust the actual ride-height in response to the threshold values and time.

9. The method for controlling the suspension system of a motor vehicle of claim 8 including the additional steps of continuously monitoring the speed of the vehicle, and maintaining the control system always in an economy mode when the vehicle speed is less than a predetermined speed.

10. The method for controlling the suspension system of a motor vehicle of claim 9 including the additional steps of monitoring the direction and amount of rotation of the steering wheel and producing counts in response thereto, creating predetermined threshold values of the number of counts indicating rotation and direction within selected time periods, incrementing and decrementing the number of counts as they are received, and inflating or deflating selected air bags in response to the threshold values being exceeded if the vehicle speed is at or above the predetermined speed and thereby the control system is in an active mode, thereby minimizing the roll of the vehicle chassis.

11. The method for controlling the suspension system of a motor vehicle of claim 9 in which the controller continues to maintain the control system in the economy mode when the vehicle speed is at or above the predetermined speed unless the threshold values of the steering system counter are exceeded.

12. The method for controlling the suspension system of a motor vehicle of claim 8 in which selecting the desired ride-height values are selected by the vehicle operator.

13. The method for controlling the suspension system of a motor vehicle of claim 8 in which the desired ride-height values are preset.

\* \* \* \* \*